US009283799B2

(12) United States Patent
Koga et al.

(10) Patent No.: US 9,283,799 B2
(45) Date of Patent: Mar. 15, 2016

(54) METHOD FOR PRODUCING THERMOREVERSIBLE RECORDING MEDIUM AND APPARATUS FOR PRODUCING THE SAME

(71) Applicants: Noboru Koga, Tokyo (JP); Takeshi Owashi, Shizuoka (JP)

(72) Inventors: Noboru Koga, Tokyo (JP); Takeshi Owashi, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/345,370

(22) PCT Filed: Mar. 14, 2013

(86) PCT No.: PCT/JP2013/053185
§ 371 (c)(1),
(2) Date: Mar. 17, 2014

(87) PCT Pub. No.: WO2013/141327
PCT Pub. Date: Sep. 26, 2013

(65) Prior Publication Data
US 2015/0005161 A1  Jan. 1, 2015

(30) Foreign Application Priority Data
Mar. 22, 2012  (JP) .................................. 2012-064654

(51) Int. Cl.
*G06K 19/07* (2006.01)
*B42D 25/23* (2014.01)
(Continued)

(52) U.S. Cl.
CPC ............. *B42D 25/47* (2014.10); *B32B 37/10* (2013.01); *B32B 37/1284* (2013.01);
(Continued)

(58) Field of Classification Search
CPC ........ B41M 5/305; B41M 5/30; G06K 19/07; G06K 19/07722; B42D 25/23; B42D 25/47
USPC ............. 503/200–226; 106/64, 456; 427/150, 427/152, 151; 156/64, 356
See application file for complete search history.

(56) References Cited

U.S. PATENT DOCUMENTS

2008/0102268 A1  5/2008  Higasa et al.
2010/0311579 A1  12/2010  Koga et al.
(Continued)

FOREIGN PATENT DOCUMENTS

BR  04-256460  9/1992
JP  2002-163619  6/2002
(Continued)

OTHER PUBLICATIONS

Oct. 22, 2014 Taiwanese official action (and English-language translation thereof) in corresponding Taiwanese patent application No. 102109713.
(Continued)

*Primary Examiner* — Bruce H Hess
(74) *Attorney, Agent, or Firm* — Cooper & Dunham LLP

(57) ABSTRACT

A method for producing a thermoreversible recording medium, containing: arranging inlets on a first base sheet to be spaced apart from each other by predetermined intervals to produce a first sheet having a product portion including the inlets and end portions at both ends of the product portion; applying an adhesive onto a second base sheet using an adhesive application unit, to produce a second sheet; passing the first sheet and the second sheet through a gap between a pair of gap rollers in the manner that the inlets and the adhesive face to each other to laminate the first sheet with the second sheet, while forming an adhesive liquid pool in an upstream of the gap; and feedback controlling an amount of the adhesive to be applied in the applying so that the adhesive liquid pool does not flow into the end portions on the first sheet.

10 Claims, 6 Drawing Sheets

(51) Int. Cl.
    *B42D 25/47* (2014.01)
    *B41M 5/30* (2006.01)
    *G06K 19/077* (2006.01)
    *B42D 25/00* (2014.01)
    *B42D 25/485* (2014.01)
    *B32B 37/10* (2006.01)
    *B32B 37/12* (2006.01)

(52) U.S. Cl.
    CPC ............... *B42D 25/00* (2014.10); *B42D 25/23* (2014.10); *B42D 25/485* (2014.10); *G06K 19/07* (2013.01); *G06K 19/077* (2013.01); *G06K 19/07722* (2013.01); *B32B 2307/75* (2013.01); *B32B 2309/72* (2013.01); *B32B 2425/00* (2013.01); *B41M 5/305* (2013.01)

(56) References Cited

U.S. PATENT DOCUMENTS

| | | |
|---|---|---|
| 2011/0224073 A1 | 9/2011 | Owashi et al. |
| 2012/0208697 A1 | 8/2012 | Yamaguchi et al. |

FOREIGN PATENT DOCUMENTS

| | | |
|---|---|---|
| JP | 2003-346114 | 12/2003 |
| JP | 2004-209810 | 7/2004 |
| JP | 2005-174161 | 6/2005 |
| JP | 2005-339462 | 12/2005 |
| JP | 2006-007153 | 1/2006 |
| JP | 2006-178566 | 7/2006 |
| JP | 2006-192799 | 7/2006 |
| JP | 2007-156589 | 6/2007 |
| JP | 2010-271836 | 12/2010 |
| JP | 2011-210243 | 10/2011 |
| KR | 10-1012242 | 8/2011 |
| TW | 464540 | 11/2001 |
| WO | WO2006/080400 | 8/2006 |

OTHER PUBLICATIONS international Search Report Issued for counterpart International Patent Application No. PCT/JP2013/058185 dated May 7, 2013.

Korean official action (and English translation thereof) dated May 27, 2015 in corresponding Korean Patent Application No. 10-2014-7013632.

METHOD FOR PRODUCING THERMOREVERSIBLE RECORDING MEDIUM AND APPARATUS FOR PRODUCING THE SAME

TECHNICAL FIELD

The present invention relates to a method for producing a thermoreversible recording medium having an electronic information recording portion (hereinafter may be referred to as an "inlet") and an apparatus for producing the same.

BACKGROUND ART

IC cards have been increasingly used in various aspects from users' daily lives to business activities. Actually, they are used, for example, as various cards (e.g., cash cards, credit cards, prepaid cards and ETC cards (electronic toll collection system)); in transportation facilities (e.g., railways and buses); as affiliate cards for digital broadcasting, 3rd generation (3G) mobile phones; in library service counters; and as student ID cards, employee ID cards, basic resident register cards. Meanwhile, the amount of IC cards disposed of has been being increasing in accordance with diversification of the current economic and social activities. In view of this, there is a keen need to create a recycling society, where material consumption is reduced and less environmental load is given, by reconsidering the current economic societies and lifestyles involving mass production, mass consumption and mass disposal to promote effective utilization and recycling of materials.

As one promising measure, electronic information recording element-embedded thermoreversible recording media (RFID tag) (hereinafter the electronic information recording element may be referred to as an "IC chip module" or "IC chip"), can be used for reducing the amount of products disposed of. This is because they can rewrite information stored in the IC chip and show information as a visible image on their surface.

Such IC chip module-embedded thermoreversible recording media have been used in the manufacturing industry as instruction sheets such as operation sheets, parts management sheets and process management sheets. Actually, there is repeatedly performed a cycle including winding an instruction sheet around a rod-like part or inserting it into a card case, and rewriting the content of the instruction sheet.

When an image is formed on or erased from it, a heating device (e.g., thermal head, erase bar, erase roller and erase plate) of the printer is pressed against the instruction sheet. Thus, rewriting of a print image on the instruction sheet (i.e., thermoreversible recording medium) must be performed so as not to break the IC chip module and not to avoid overflow of an adhesive from an adhesion portion between the IC chip module and the thermoreversible recording medium. Furthermore, desirably, the instruction sheet is flexible and shows a high-quality image.

High print quality of images is maintained by improving close-contact properties of the surface of a reversible thermosensitive recording layer with a printer head. In order to improve the close-contact properties, a thermoreversible recording medium must be thin and uniform in total thickness.

However, the thickness of an inlet portion and the thickness of an IC chip portion of an electronic information recording element cause a bottleneck to make the total thickness of the thermoreversible recording medium to be thin and uniform. By absorbing these thicknesses into an adhesive or a base, the total thickness of the thermoreversible recording medium can be made thin while the surface of the reversible thermosensitive recording layer being kept smooth.

Moreover, there is a problem that air bubbles 610 tend to be included in corners of the surrounding area of an inlet 600, when the inlet is mounted by laminating sheets, as illustrated in FIG. 1. The inclusion of the air bubbles at the corners of the surrounding of the inlet 600 may cause surface unevenness of a thermoreversible recording medium, leading to recording and erasure failures as the thermoreversible recording medium is printed by a printer.

When an inlet sheet and an adhesive sheet are laminated by a pair of rubber nip rollers, for example, the inlet is nipped with the surfaces of the two nip rollers. As the sheets enter into the space between the nip rollers with the surrounding of the inlet forming a triangle space due to the height of the inlet, and the air included therein, air bubbles are included in a final product. As a diameter of the roller increases, more likely air bubbles are included therein.

In order to solve the aforementioned problems, for example, proposed is a method for producing an IC card containing: supplying an adhesive from multiple nozzles to apply the adhesive in the form of a plurality of lines on at least part of a surface of an inlet film, a surface of a surface film, or both; laminating the inlet film and the surface film; and compressing the laminate to roll out the adhesive applied in the form of lines, to thereby bond the inlet film with the surface film (see PTL 1).

In the proposed method, after applying the adhesive in the form of the multiple lines, the laminate is pressed by a press roller to give a desirable thickness of the adhesive over the entire width. In this method, however, the adhesive liquid is dropped on the inlet film from the top while the inlet film is transported, and the sheets are bonded just after air bubbles are included. Therefore, there is a possibility that air bubbles are enclosed at the points where the rolled out adhesive meets with the other.

Accordingly, it has been desired to provide a method for continuously producing with high efficiency a thermoreversible recording medium being thin and uniform in total thickness which method enables lamination without inclusion of air bubbles and prevention of recording failure and print failure caused by surface unevenness.

CITATION LIST

Patent Literature

PTL 1: International Publication No. WO2006/080400

SUMMARY OF INVENTION

Technical Problem

An object of the present invention is to provide a method for continuously producing with high efficiency a thermoreversible recording medium being thin and uniform in total thickness which method enables lamination without inclusion of air bubbles and prevention of recording failure and print failure caused by surface unevenness.

Solution to Problem

Means for solving the above-mentioned problems are as follows:

A method for producing a thermoreversible recording medium of the present invention contains:

arranging inlets on a first base sheet to be spaced apart from each other by predetermined intervals to thereby produce a first sheet, where the first sheet has a product portion including the inlets and end portions at both ends of the product portion;

applying an adhesive onto a second base sheet using an adhesive application unit, to produce a second sheet;

passing the first sheet and the second sheet through a gap between a pair of gap rollers in the manner that the inlets and the adhesive face to each other to laminate the first sheet with the second sheet, while forming an adhesive liquid pool in an upstream of the gap; and feedback controlling an amount of the adhesive to be applied in the applying so that the adhesive liquid pool does not flow into the end portions on the first sheet.

Advantageous Effects of Invention

The present invention can solve the above-mentioned conventional problems and achieve the above-mentioned object. That is, the present invention can provide a method for continuously producing with high efficiency a thermoreversible recording medium being thin and uniform in total thickness which method enables lamination without inclusion of air bubbles and prevention of recording failure and print failure caused by surface unevenness.

DESCRIPTION OF EMBODIMENTS

Figure 1:
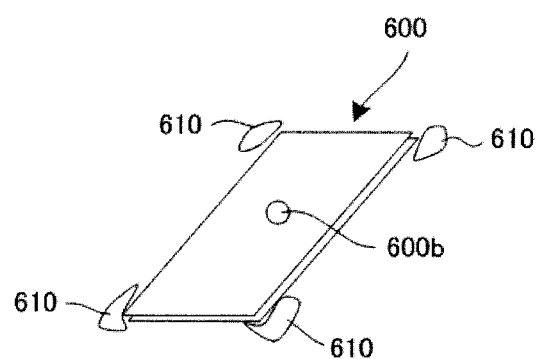
FIG. 1 is an explanatory view illustrating air bubbles included at corners on the periphery of an inlet during enclosing the inlet.

Method and Apparatus for Producing Thermoreversible Recording Medium

A method for producing a thermoreversible recording medium of the present invention includes a first sheet production step, a second sheet production step, a lamination step, and a control step; and, if necessary, further includes other steps.

An apparatus for producing a thermoreversible recording medium of the present invention includes a first sheet production unit, a second sheet production unit, a lamination unit, and a control unit; and, if necessary, further includes other units.

The method for producing a thermoreversible recording medium of the present invention can be suitably performed using the apparatus for producing a thermoreversible recording medium of the present invention. The first sheet production step can be performed using the first sheet production unit. The second sheet production step can be performed using the second sheet production unit. The lamination step can be performed using the lamination unit. The control step can be performed using the control unit. The other steps can be performed using the other units.

<First Sheet Production Step and First Sheet Production Unit>

The first sheet production step is arranging inlets on a first base sheet to be spaced apart from each other by predetermined intervals to thereby produce a first sheet, where the first sheet has a product portion including the inlets and end portions at both ends of the product portion. The first sheet production step is performed using the first sheet production unit.

Hereinafter, the first sheet may be referred to as an "inlet sheet."

<<Inlet Sheet (First Sheet)>>

The inlet sheet is not particularly limited and may be appropriately selected depending on the intended purpose as long as inlets are arranged to be spaced apart from each other by predetermined intervals on the first base sheet. For example, the inlet sheet preferably has inlets which are arranged to be spaced apart from each other by predetermined intervals on the base sheet; has the product portion including the inlets and the end portions at both ends of the product portion; has a reversible thermosensitive recording layer on a side of the first base sheet on which no inlet is arranged; and, if necessary, further includes other layers.

—Inlet—

The inlet includes, on a circuit board, a convex-shaped electronic information recording element (hereinafter may be referred to as an "IC portion") and an antenna circuit; and, if necessary, further includes other members.

The base material for use in forming the circuit board is not particularly limited and may be appropriately selected depending on the intended purpose. Examples of thereof include rigid-type materials such as paper phenol, glass epoxy and composites; flexible-type materials such as polyimides, polyesters, polypropylenes, polyethylenes, polystyrenes, nylon, polyethylene terephthalate (PET), paper and synthetic paper; and complex-type materials of the rigid-type materials and the flexible-type materials.

The thickness of the base material for use in forming the circuit board is not particularly limited and may be appropriately selected depending on the intended purpose. It is, however, preferably 15 μm to 360 μm. Further, from the viewpoints that the thermoreversible recording medium is made thin to improve the flexibility, a base having the electronic information recording element which is lower in height allows the thermoreversible recording medium to be thin, and a base having the circuit board and the antenna circuit which are small in thickness enables making an adhesive layer for covering and coating the base thin and is excellent in processability and cost performance, it is more preferably 15 μm to 100 μm.

For example, when a metal foil serving as the antenna circuit is laminated on the base material for use in forming the circuit board, the metal foil is not particularly limited, and a copper foil, an aluminum foil, an iron foil may be used, for example. Among them, the aluminum foil is preferable for its excellence in costs and processability. The thickness thereof is not particularly limited and may be appropriately selected depending on the intended purpose, but is preferably 6 μm to 50 μm.

The shape of the base material for use in forming the circuit board is not particularly limited and may be appropriately selected depending on the intended purpose. For example, a square, a rectangle, a circular shape, and an ellipse shape are exemplified.

The thickness (height) of the electronic information recording element is not particularly limited and may be appropriately selected depending on the intended purpose. It is, however, preferably 200 μm or less, and more preferably 25 μm to 140 μmo. In addition, in order to protect the electronic information recording element, a protective film such as a polyimide film, a polyester film, and paper can also be bonded on the electronic information recording element.

The method for forming the antenna circuit is not particularly limited and may be appropriately selected depending on the intended purpose. Examples of thereof include a method of etching metal films stacked on the circuit board, a method of repeatedly rolling up a covered electric wire (e.g., enamel wire) on the same surface of a base, a method of printing so-called electroconductive paste on the circuit board, a method of embedding the antenna circuit in a base, and a method of laminating a metal foil serving as the antenna circuit.

The thickness of the protective film is not particularly limited and may be appropriately selected depending on the intended purpose. The thickness is preferably 10 μm to 60 μm, for example.

A center-to-center distance (pitch) between adjacent inlets on the inlet sheet is not particularly limited and may be appropriately selected depending on the intended purpose, but is preferably 1 mm to 500 mm, more preferably 1 mm to 300 mm. When the pitch is shorter than 1 mm, air bubbles may be included during lamination, leading to lamination failure.

In the inlet, a coiled antenna circuit and a capacitative element are formed on a circuit board (e.g., a plastic film) to form an LC resonance circuit, and thereby the inlet can receive a radio wave having a constant frequency as well as transmit and sent back information of an electronic information recording element (IC chip) to its transmission source.

As a communication frequency, generally, it is appropriately selected from frequency bands (e.g., 125 kHz, 13.56 MHz, 2.45 GHz, 5.8 GHz (microwave) and a UHF band) for use.

A commercially available product of the inlet sheet is not particularly limited and may be appropriately selected depending on the intended purpose. For example, inlets sheets available from, for example, UPM, OMRON, Alien Technology Corporation, Sony Corporation, FUJITSU LIMITED, Hitachi, Ltd., Texas Instruments Incorporated, Fujii Corporation, Dai Nippon Printing Co., Ltd., and TOPPAN PRINTING CO., LTD. can be used.

—First Base Sheet—

The first base sheet is not particularly limited as to its shape, structure and size, and may be appropriately selected depending on the intended purpose. Examples of the shape include a film shape, and a sheet shape. Examples of plane shapes include a square, and a circular shape. Examples of the structure include a single-layer structure, and a multi-layered structure. The size may be appropriately selected depending on the intended purpose.

The first base sheet is not particularly limited and may be appropriately selected depending on the intended purpose. The base sheet may be, for example, a resin sheet, a rubber sheet, a synthetic paper, a metal sheet, a glass sheet or a composite thereof. Among them, the resin sheet is particularly preferred.

A material for forming the resin sheet is not particularly limited and may be appropriately selected depending on the intended purpose. Examples thereof include polyethylene terephthalate, polycarbonate, polystyrene, and polymethyl methacrylate. These may be used alone or in combination. Among them, polyethylene terephthalate is particularly preferred.

The first base sheet may be appropriately synthesized or may be a commercially available product.

The first base sheet usually has concave portions into which the inlets are inserted.

A method of forming the concave portion in the first base sheet is not particularly limited and may be appropriately selected depending on the intended purpose. Examples thereof include laser processing, micro-mill processing, and perforated board lamination.

The average thickness of the first base sheet is not particularly limited and may be appropriately selected in view of the depth of the concave portion, if present. The thickness is preferably 20 μm to 300 μm, and more preferably 50 μm to 188 μm.

When the average thickness of the first base sheet is less than 20 μm, it may be difficult to insert the inlet into the concave portion. When the thickness of the first base sheet is more than 300 μm, the thickness of the thermoreversible recording medium is increased, causing lack of flexibility, and it may be difficult to efficiently inserting plural stacked sheets of thermoreversible recording media into a printer.

The inlet sheet has the product portion including the inlets and end portions at both ends of the product portion.

The width of the end portions is not particularly limited and may be appropriately selected depending on the intended purpose, but is preferably 2 mm to 300 mm, more preferably 2 mm to 10 mm.

—Reversible Thermosensitive Recording Layer—

The reversible thermosensitive recording layer reversibly changes in color tone and contains a reversible thermosensitive recording material reversibly changing in color depending on change in temperature. The reversible thermosensitive recording material changes in color as a result of changing in combination, for example, of light transmittance, light reflectance, light absorption wavelength and light scattering degree.

The reversible thermosensitive recording material is not particularly limited and may be appropriately selected depending on the intended purpose as long as it can reversibly change in transparency or color tone by heat. Examples of thereof include those which turn into a first color at a first temperature higher than ambient temperature and turn into a second color after heating at a second temperature higher than the first temperature and then cooling. The reversible thermosensitive recording material which turns into another color at first and second temperatures is particularly preferable.

Specific examples include a material which becomes transparent at a first temperature and becomes opaque at a second temperature (see Japanese Patent Application Laid-Open (JP-A) No. 55-154198), a material which develops color at a second temperature and becomes colorless at a first temperature (see JP-A Nos. 04-224996, 04-247985 and 04-267190), a material which becomes opaque at a first temperature and becomes transparent at a second temperature (see JP-A No. 03-169590), and a material which turns into, for example, black, red, or blue at a first temperature and becomes colorless at a second temperature (see JP-A Nos. 02-188293 and 02-188294). Particularly preferred are dispersions of an organic low-molecular-weight material (e.g., higher fatty acids) in a base resin; and mixtures of a leuco dye and a color developer.

The leuco dye is not particularly limited and may be appropriately selected depending on the intended purpose. Examples of the leuco dye include phthalide compounds, azaphthalide compounds and fluoran compounds. These may be used alone or in combination.

The color developer is not particularly limited and may be appropriately selected depending on the intended purpose. Examples of the color developer include those disclosed in, for example, JP-A Nos. 05-124360, 06-210954 and 10-95175. These may be used alone or in combination.

The color developer is a compound having, in the molecule thereof, one or more structure allowing a leuco dye to develop color (e.g., a phenolic hydroxyl group, carboxylic acid group and phosphoric acid group) and one or more structure controlling an intermolecular force (e.g., a structure containing a long chain hydrocarbon group). These structures may be linked to each other via a di- or higher polyvalent linking group containing a hetero atom. Also, the long chain hydrocarbon group may have such a linking group and/or an aromatic group.

Examples of such a color developer include those disclosed in, for example, JP-A Nos. 09-290563 and 11-188969. Among them, preferred is at least one compound selected from compounds represented by the following General Formulas (1) and (2). These color developers have much higher sensitivity than conventional color developers, and thus energy applied for image formation can be reduced by about 10% to about 30%. In this case, thermal decomposition of the color developer can be reduced, and less damage is given to the thermoreversible recording medium and the surface thereof. As a result, durability after repetitive use does not degrade, maintaining excellent image quality.

General Formula (1)

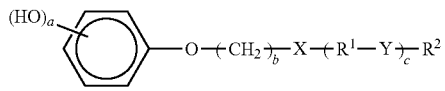

In General Formula (1), X and Y each independently represent a hetero atom-containing divalent organic group, $R^1$ represents a substituted or unsubstituted divalent hydrocarbon group, $R^2$ represents a substituted or unsubstituted monovalent hydrocarbon group, a denotes an integer of 1 to 3, b denotes an integer of 1 to 20, and c denotes an integer of 0 to 3.

General Formula (2)

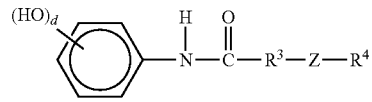

In General Formula (2), Z represents a hetero atom-containing divalent organic group, $R^3$ represents a substituted or unsubstituted divalent hydrocarbon group, $R^4$ represents a substituted or unsubstituted monovalent hydrocarbon group, and d denotes an integer of 1 to 3.

In General Formulas (1) and (2), as described above, X, Y and Z each independently represent a hetero atom-containing divalent organic group, and preferably represent a nitrogen or oxygen atom-containing divalent organic group; e.g., divalent organic groups containing at least one selected from the groups represented by the following structural formulas.

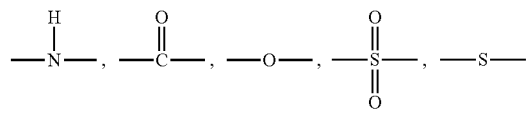

Suitable examples of the hetero atom-containing divalent organic group include those represented by the following structural formulas.

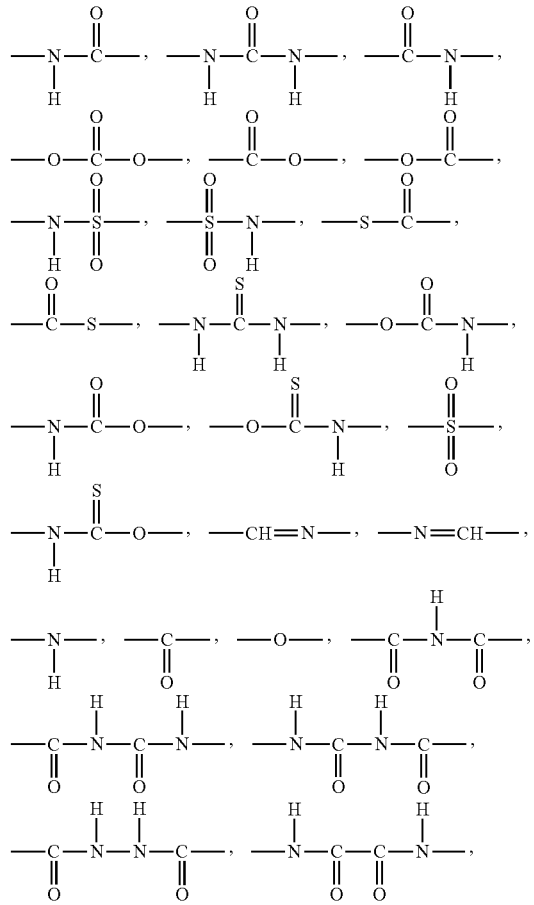

-continued

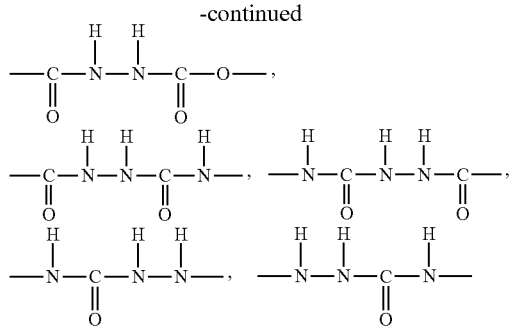

Among them, particularly preferred are those represented by the following structural formulas.

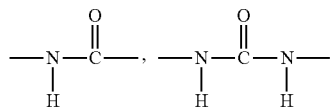

In General Formulas (1) and (2), $R^1$ and $R^3$ each represent an optionally substituted divalent hydrocarbon group having 1 to 20 carbon atoms.

Suitable groups represented by $R^1$ or $R^3$ include those represented by the following structural formulas:

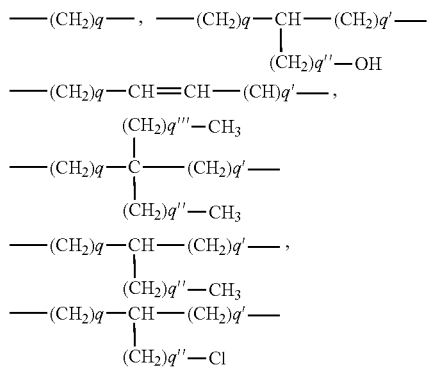

where each of q, q', q" and q''' denotes an integer satisfying the following condition: the total number of carbon atoms contained in the groups represented by $R^1$ or $R^3$ is 1 to 20. Among them, groups represented by —$(CH_2)_q$— are particularly preferred.

In General Formulas (1) and (2), $R^2$ and $R^4$ each represent an optionally substituted aliphatic hydrocarbon group having 1 to 24 carbon atoms, preferably 8 to 18 carbon atoms.

The aliphatic hydrocarbon group may be linear or branched, and may have an unsaturated bond. Examples of the substituent linked to the hydrocarbon group include a hydroxyl group, a halogen atom and an alkoxy group. When the total number of carbon atoms contained in groups $R^1$ and $R^2$ or groups $R^3$ and $R^4$ is 7 or less, stable color development or color erasure deteriorates. Thus, the total number is preferably 8 or more, more preferably 11 or more.

Suitable groups represented by $R^2$ or $R^4$ include those represented by the following structural formulas:

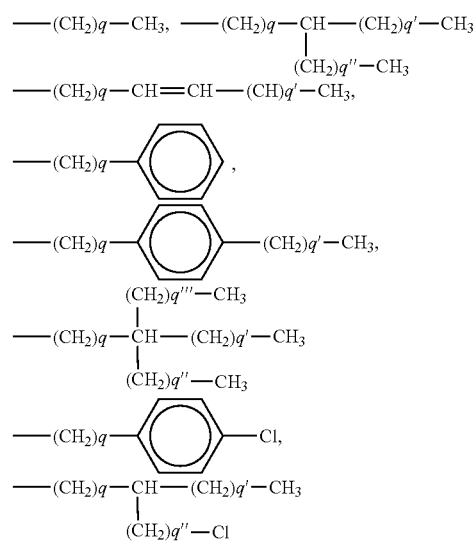

where each of q, q', q" and q''' denotes an integer satisfying the following condition: the total number of carbon atoms contained in the groups represented by $R^2$ or $R^4$ is 1 to 24. Among them, groups represented by —$(CH_2)_q$—$CH_3$ are particularly preferred.

If necessary, the reversible thermosensitive recording layer may further contain an additive for improving and/or controlling coating property of a coating liquid therefor and color developability/erasability thereof. Examples of the additive include surfactants, conductivity-imparting agents, fillers, antioxidants, color development stabilizers and color erasure promoter.

The reversible thermosensitive recording layer preferably contains a leuco dye, a color developer and an additive together with a binder resin. The binder resin is not particularly limited and may be appropriately selected depending on the intended purpose, as long as it can bond the leuco dye, the color developer and the additive onto the base sheet. Particularly preferred examples of the binder resin include resins which have been cured using heat, ultraviolet (UV) ray, or electron beam (EB) for improving durability after repetitive use. Particularly preferred are thermally-cured resins using a curing agent. These resins can increase a gel ratio of the reversible thermosensitive recording layer.

The thermally-curable resin is not particularly limited and may be appropriately selected depending on the intended purpose. Examples of the thermally-curable resin include acryl polyol resins, polyester polyol resins, polyurethane polyol resins, polyvinyl butyral resins, cellulose acetate propionate and cellulose acetate butyrate.

The curing agent is not particularly limited and may be appropriately selected depending on the intended purpose. Preferably, isocyanates are used. Examples of the isocyanate include hexamethylene diisocyanate (HDI), tolylene diisocyanate (TDI), xylylene diisocyanate (XDI) and isophorone diisocyanate (IPDI); an adduct type, burette type, or isocyanurate type formed between, for example, trimethylolpropane and the above isocyanates; and blocked products of the above isocyanates. Among them, preferred are hexamethylene diisocyanate, an adduct type thereof, a burette type thereof and an isocyanurate type thereof. Note that the entire curing agent used may not participate in curing reaction. In other words, the reversible thermosensitive recording layer may contain an unreacted curing agent. Also, curing catalysts may be used for allowing curing reaction to successfully proceed.

The reversible thermosensitive recording layer is not particularly limited and may be appropriately selected depending on the intended purpose, but preferably has a gel ratio of 30% or higher, more preferably 50% or higher, further preferably 70% or higher. When the gel ratio is lower than 30%, the reversible thermosensitive layer may exhibit degraded durability after repetitive use.

Here, the gel ratio can be measured by immersing a coated film in a solvent having a high dissolution capability. Specifically, a reversible thermosensitive recording layer is peeled off from a base sheet, followed by weighing (initial mass); and the thus-obtained reversible thermosensitive recording layer is sandwiched between 400-mesh wire gauzes and then immersed in a solvent capable of dissolving an uncured binder resin for 24 hours, followed by drying in vacuum and weighing (post-drying mass). From the obtained values, the gel ratio can be calculated using the following Equation 1:

Gel ratio (%)=(post-drying mass)/(initial mass)×100  <Equation 1>

Notably, the mass of components other than the binder resin (e.g., particles of organic low-molecular-weight materials), which are contained in the reversible thermosensitive recording layer, is not taken into account for calculation. When the mass of particles of organic low-molecular-weight materials is not previously obtained, it may be calculated from a mass ratio of the binder resin to the particles of organic low-molecular-weight materials. The mass ratio can be determined based on their specific gravities and a ratio of an area occupied with the binder resin to that occupied with the particles of organic low-molecular-weight materials obtained by observing a unit area of the cross portion of the layer through, for example, a transmission electron microscopy (TEM) or a scanning electron microscopy (SEM).

In the reversible thermosensitive recording layer, a mass ratio of the binder resin to a chromogenic component is not particularly limited and may be appropriately selected depending on the intended purpose, but is preferably 0.1 to 10. When the mass ratio is less than 0.1, the formed reversible thermosensitive recording layer has insufficient heat resistance; whereas when the mass ratio is more than 10, the density of color developed may decrease.

The reversible thermosensitive recording layer can be formed through application of a coating liquid prepared by homogeneously dispersing, in a solvent, a leuco dye, a color developer, an additive and a binder resin.

The solvent is not particularly limited and may be appropriately selected depending on the intended purpose. Examples thereof include alcohols, ketones, ethers, glycol ethers, esters, aromatic hydrocarbons and aliphatic hydrocarbons.

The coating liquid can be prepared using a disperser such as a paint shaker, a ball mill, an attriter, a three-roll mill, a Kady mill, a sand mill, a Dino mill or a colloid mill. Here, the coating liquid may be prepared by dispersing the above materials in a solvent using a disperser or may be mixing dispersions of the above materials one another. Also, these materials are dissolved in a solvent under heating and then the solution is rapidly or slowly cooled for precipitation.

Examples of application methods for forming the reversible thermosensitive recording layer include a blade coating, a wire bar coating, a spray coating, an air knife coating, a bead coating, a curtain coating, a gravure coating, a kiss coating, a reverse roll coating, a dip coating or a die coating.

The average thickness of the reversible thermosensitive recording layer is not particularly limited and may be appropriately selected depending on the intended purpose. It is preferably 1 µm to 20 µm, more preferably 3 µm to 15 µm. When the average thickness is less than 1 µm, the density of color developed may decrease to degrade the contrast of the formed image. Whereas when the average thickness is more than 20 µm, position-dependent variation in the amount of heat applied becomes large in the reversible thermosensitive recording layer. Some portions of the recording layer do not develop color since the temperature of the portions does not reach a color developing temperature, potentially resulting in failure to attain a desired color density.

Note that the reversible thermosensitive recording layer is not particularly limited, may be provided on the first base sheet before the lamination of the inlets with the first base sheet, or may be provided on the first base sheet after the lamination of the inlets with the first base sheet.

Examples of other layers include a under layer, an intermediate layer and a protective layer.

Example of a production method of the inlet sheet includes a method in which concave portions are formed on the first base sheet by means of laser, machining, engraving, or perforated board lamination, and then IC portions of the inlets are inserted into the concave portions (antenna ICs (i.e., convex portions) are inserted into counterbores (i.e., concave portions)) to thereby laminate together.

<Second Sheet Production Step and Second Sheet Production Unit>

The second sheet production step is applying an adhesive onto a second base sheet using an adhesive application unit, to produce a second sheet, and the second sheet production step is performed using the second sheet production unit.

Hereinafter, the second sheet may be referred to as an "adhesive sheet."

—Second Base Sheet—

The second base sheet used for the second sheet may be the same as the first base sheet.

The average thickness of the second base sheet in the second sheet is not particularly limited and may be appropriately selected depending on the intended purpose, but is preferably 20 µm to 300 µm, more preferably 50 µm to 188 µm.

—Adhesive—

An adhesive material in the adhesive is not particularly limited and may be appropriately selected depending on the intended purpose. Examples of the adhesive material include urea resins, melamine resins, phenol resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester resins, polyurethane resins, polyamide resins, chlorinated polyolefin resins, polyvinyl butyral resins, acrylic acid ester copolymers, methacrylic acid ester copolymers, natural rubbers, synthetic rubbers, cyanoacrylate resins, silicone resins, styrene-isoprene-styrene block copolymers and ethylene-vinyl acetate copolymers (EVA). Among them, preferred are natural rubbers, synthetic rubbers, acrylic resins, silicone resins, polyurethane resins, styrene-isoprene-styrene block copolymers and ethylene-vinyl acetate copolymers (EVA), with acrylic resins being particularly preferable.

The adhesive is preferably a wet-curable type adhesive which discharges carbon dioxide gas when cured in wetness. However, in the case of the wet-curable type adhesive, when voids including moisture and air are present between an inlet and an adhesive sheet, carbon dioxide gas is generated, and the surface of the resulting thermoreversible recording medium swells. As a result, a thermoreversible recording medium having a smooth surface cannot be obtained. Such generation of bubbles continues for approximately three days and therefore the surface configuration of the recording medium greatly changes.

The adhesive may be a commercially available product. Example of thereof includes PUR-HM adhesive PERFECT LOCK series (product of Henkel Technologies Japan Ltd.)

The adhesive is applied onto the second base sheet using the adhesive application unit. The adhesive application unit is not particularly limited and may be appropriately selected depending on the intended purpose. Example thereof includes a dispenser.

The adhesive application unit is preferably provided in an upstream of a gap between a pair of gap rollers.

The average thickness of the adhesive layer is not particularly limited and may be appropriately selected depending on the intended purpose. However, provided that when the same thickness as that from the bottom surface of the base of the electronic information recording portion to a plane of the antenna circuit (the thickness of an antenna portion) is defined as +0 µm, the average thickness of the adhesive layer is preferably +0 µm to +280 µm, more preferably +0 µm to +100 µm, and particularly preferably +0 µm to 60 µm. When the average thickness of the adhesive layer is less than that of the antenna portion, the thickness uniformity of the resulting thermoreversible recording medium is insufficient, and the print quality degrades. With respect to the maximum value of the thickness, by way of an example, when the adhesive layer is formed to have a thickness exceeding +150 µm relative to 100 µm in thickness of the antenna portion so that a total thickness exceeds 250 µm, the adhesive layer is melted by heat pressure from a thermal head, and an adhesive liquid pool may overflow into the end portions when printing or erasing is performed on the thermoreversible recording medium using a heater.

The width of the adhesive sheet (second sheet), to which the adhesive is applied, is not particularly limited and may be appropriately selected depending on the intended purpose, but is preferably 70% to 100% relative to the width of the product portion on the inlet sheet (first sheet). When it is less than 70%, the lamination portions at the ends of the sheets may not be completely filled with the adhesive liquid regardless of viscosity or inlet inclusion/lamination unless the adhesive liquid pool is controlled. Specifically, a surface level of the adhesive to be spread is unstably moved up and down to form a thin space as the laminate is passed through the nip between the gap rollers, and therefore unexpected oval-shaped air bubbles tend to be included. An adhesive sheet with such air bubble defect forms only a slight deformation, and therefore it is very difficult to detect by a defect detecting device, and therefore there is a possibility that a product having such defect may be brought into a market without being detected. When the applied width is 70% or more, on the other hand, the space between the gap rollers can be stably filled with the adhesive by controlling the spread of the adhesive liquid pool by bead controlling, and therefore oval-shaped air bubbles are not included.

The viscosity of the adhesive is not particularly limited and may be appropriately selected depending on the intended purpose. However, at lamination temperature, it is preferably 10,000 cps to 100,000 cps, more preferably 20,000 cps to 70.000 cps from the viewpoint of preventing a displacement of the inlet during passing through a gap between a pair of gap rollers due to low viscosity.

When the viscosity of the adhesive is less than 10,000 cps, the adhesive easily flows, and thus, the adhesive liquid pool (bead) rapidly spreads laterally. Therefore, the amount of the adhesive to be applied should be adjusted sensitively and rapidly. When the viscosity of the adhesive is less than 10,000 cps, the adhesive liquid pool cannot be formed on the periphery of the inlet. When the adhesive has low viscosity, the inlet moves to thereby cause a displacement. Additionally, larger end portions are required because the bead excessively spreads.

The viscosity of the adhesive is related to the temperature and is determined based on a curve representing a relationship between viscosities and temperatures of an adhesive. Therefore, the viscosity of the adhesive should be controlled by temperature control.

In the case where the adhesive layer in the adhesive sheet is formed as an exposed layer, an antistatic electroconductive filler is preferably contained in the adhesive layer. The antistatic electroconductive filler is contained so as to prevent double feed in a printer due to sticking, and improve processing of stacking thermoreversible recording media. The antistatic electroconductive filler is not particularly limited and may be appropriately selected depending on the intended purpose. Examples thereof include an inorganic filler and an organic filler.

Examples of the inorganic filler include carbonates, silicates, metal oxides and sulfuric acid compounds.

Examples of the organic filler include silicone resins, cellulose resins, epoxy resins, nylon resins, phenol resins, polyurethane resins, urea resins, melamine resins, polyesters, polycarbonates, styrene resins, acrylic resins, polyethylenes, formaldehyde resins and polymethyl methacrylates.

<Lamination Step and Lamination Unit>

The lamination step is passing the first sheet and the second sheet through a gap between a pair of gap rollers in the manner that the inlets and the adhesive face to each other to laminate the first sheet with the second sheet, while forming an adhesive liquid pool in an upstream of the gap. The lamination step is performed using the lamination unit.

The method for laminating the inlet sheet with the adhesive sheet is not particularly limited. For example, an adhesive may applied to the inlet sheet, and thereby the inlet sheet can be laminated with the adhesive sheet. However, from the viewpoint of production efficiency and possibility of smooth and uniform application, it is preferable that an adhesive be applied to the adhesive sheet to thereby perform the lamination.

The adhesive can be applied to the entire surface of the adhesive sheet, however, the adhesive is preferably selectively applied.

Employing gap rollers rather than nip rollers in the lamination step allows the total thickness of the thermoreversible recording medium to be uniform due to a possibility of minor adjustment in thickness.

In the lamination step, the first sheet is preferably laminated with the second sheet at 60° C. to 100° C. In the above preferred temperature range, the viscosity of the adhesive is controlled to fall within a range from 10,000 cps to 100,000 cps, which can prevent a displacement of the inlets during passing through between the gap rollers.

The thickness of the adhesive liquid pool is preferably thicker than the thickness of the adhesive upon application on the second base sheet and the thickness of the adhesive between the pair of gap rollers.

The length in height direction (thickness) of the adhesive liquid pool formed during passing the inlet sheet and the adhesive sheet through the gap between the gap rollers is thicker than an average thickness of the inlets, is preferably 10 times or more as thick as the average thickness of the inlets, and is more preferably 300 µm to 5 mm.

A material of the gap roller is not particularly limited and may be appropriately selected depending on the intended purpose, as long as it has high surface hardness. However, it is preferably metal. Example thereof includes stainless steel (e.g., SUS 304).

The surface hardness HV of the gap roller is not particularly limited and may be appropriately selected depending on the intended purpose, but is preferably 180 or more. When the surface hardness HV is less than 180, a thermoreversible recording medium, which is a finished product, is affected in the total thickness and surface unevenness due to a concavo-convex shape of the inlet. Meanwhile, when a nip roller is used, regardless of material (e.g., a metal roller, a rubber roller or a resin roller), a thermoreversible recording medium, which is a finished product, is affected by nip pressure in the total thickness and surface unevenness due to a concavo-convex shape of the inlet.

Herein, the surface hardness HV is measured by a method using a square pyramid-shaped diamond indenter, which is one of indentation hardness test methods. The indenter is according to JIS B7725.

A roller diameter of the gap roller is not particularly limited and may be appropriately selected depending on the intended purpose, but is preferably 80 mm to 250 mm.

The transfer speed at which the inlet sheet and the adhesive sheet are transferred into between the gap rollers is not particularly limited and may be appropriately selected depending on the intended purpose. It is preferably 1 m/min to 100 m/min, and more preferably 2 m/min to 10 m/min.

When the transfer speed is lower than 1 m/min, the conveyance control (speed) easily varies. When the transfer speed is higher than 100 m/min, the precision of width-direction aligning of the sheet may degrade.

<Control Step and Control Unit>

The control step is feedback controlling an amount of the adhesive to be applied in the applying so that the adhesive liquid pool does not flow into the end portions on the first sheet; and is performed using the control unit.

It is preferred that the control step contain detecting the adhesive liquid pool by a sensor, and increasing the amount of the adhesive to be applied by the adhesive application unit in the applying in the case where the adhesive liquid pool does not reach the end portions of the first sheet and spreads within the product portion, or decreasing the amount of the adhesive to be applied by the adhesive application unit in the applying in the case where the adhesive liquid pool flow over the product portion into the end portions on the first sheet.

Examples of the sensor include a single point laser displacement sensor, a straight line-shaped two-dimensional displacement sensor, an imaging camera sensor and an infra-red temperature detection sensor. Among them, the imaging camera sensor is preferred. Example of the imaging camera includes a CCD camera.

—Feedback Control of Adhesive Liquid Pool (Bead Control)—

By performing the feedback control of the adhesive liquid pool, specifically constantly applying the adhesive with an excessive amount and detecting the adhesive liquid pool by a CCD camera, the adhesive liquid pool is prevented from being spread into the end portions, and it is possible to continuously produce a thermoreversible recording medium with controlling an applied width of the adhesive to be constant.

At the beginning of the production line of the thermoreversible recording medium, an applied amount of the adhesive is set to be an excessive amount relative to an amount required for one product to accumulate the adhesive, which forms an adhesive liquid pool. Then, provided is a sensor, which detects both left and right edges of the adhesive liquid pool from the front side that faces the adhesive liquid pool. Using the sensor, positions of the left and right edges (left and right end portions) of the adhesive liquid pool are detected. The information obtained by the sensor is feedback to an inverter of a gear pump to increase or decrease the amount of the adhesive to be applied with increasing or decreasing the rotational speed of the pump, so as not to spread the adhesive liquid pool into the end portions. In this manner, the size of the adhesive liquid pool is repeatedly increased or degreased, to thereby perform the bead control (see FIG. 6).

Figure 6:
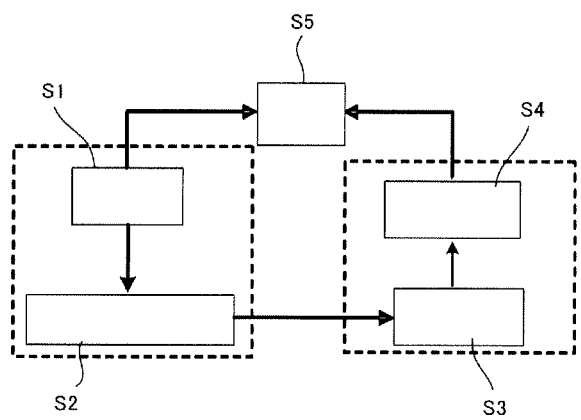
FIG. 6 is an explanatory view illustrating a feedback control performed in a control step in a method for producing a thermoreversible recording medium according to the present invention.

FIG. 6 is a diagram illustrating one example of the feedback control (bead control) of the adhesive liquid pool. The left edge (left end portion), right edge (right portion), and height of the adhesive liquid pool are detected by a CCD camera serving as an image sensor from the upstream side to judge the necessity of an increase or decrease in the ejection amount of the adhesive. In the case where it is necessary to increase the ejection amount of the adhesive, a rotational speed of a gear pump is increased via an inverter. In the case where it is necessary to decrease the ejection amount of the adhesive, the rotational speed of the gear pump is decreased via the inverter.

Here, the overflow width of the adhesive liquid pool was measured both in the case where the control for the adhesive liquid pool (bead control) was performed, and the case where the bead control was not performed. The results are presented in FIG. 7.

Figure 7:
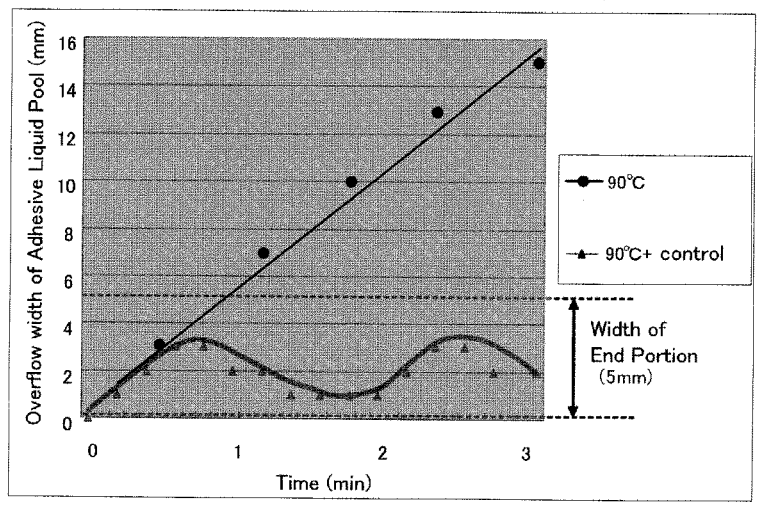
FIG. 7 is a graph showing measurement results of overflow widths of an adhesive liquid pool with or without an adhesive liquid pool control.

It can be seen from the results of FIG. 7 that it is possible to maintain the overflow width of the adhesive liquid pool within the width of the end portion as the bead control is performed.

In accordance with the method for producing a thermoreversible recording medium of the present invention, an adhesive liquid pool 106 is formed between a pair of gap rollers, which are accurately regulated with an inlet sheet 103 and an adhesive sheet 104 to give a target total thickness, as illustrated in FIGS. 4A to 4C, and 5.

When the inlet sheet 103 and the adhesive sheet 104 are passed through a pair of the gap rollers, the inlet 102 is enclosed by the adhesive liquid pool 105 without including air bubbles therein. Moreover, the inlet is passed through a pair of the gap roller while the inlet gradually pushes air bubbles against the surface of the adhesive liquid pool 105 the amount of which are controlled to be constant.

In accordance with the method for producing a thermoreversible recording medium of the present invention, leveling by passing the inlet sheet 103 and the adhesive sheet 104 through between a pair of the gap roller, and control for the adhesive liquid pool are performed. Specifically, the adhesive in the more amount than necessary is provided between a pair of the gap roller, and the sheets are passed through between the rollers maintaining a uniform gap to level front and back surfaces, to thereby provide a thermoreversible recording medium having uniform smoothness and total thickness.

In accordance with the method for producing a thermoreversible recording medium of the present invention, moreover, the start up time can be significantly reduced. In a conventional method, it takes 4 hours to start up to adjust uniformly of three layers to be applied. As the method of the present invention employs a bead control system, high speed start can be achieved within 5 minutes without affecting a uniformity of a film thickness of an adhesive to be applied.

(Thermoreversible Recording Medium)

The thermoreversible recording medium of the present invention is produced by the method for producing a thermoreversible recording medium of the present invention, and includes inlets each of which has a convex-shaped electronic information recording element and an antenna circuit on a circuit board, a reversible thermosensitive recording layer, and a base sheet including a plurality of concave portions on a surface thereof opposite to a surface thereof on which the reversible thermosensitive recording layer is provided, wherein the convex-shaped electronic information recording element is laminated so as to be inserted into the concave portion.

The total thickness of the resultant thermoreversible recording medium is not particularly limited and may be appropriately selected depending on the intended purpose, but is preferably 350 µm to 410 µm. In-plane thickness variation in a front surface and a back surface of the thermoreversible recording medium is preferably 25 µm or less.

Figure 2A:
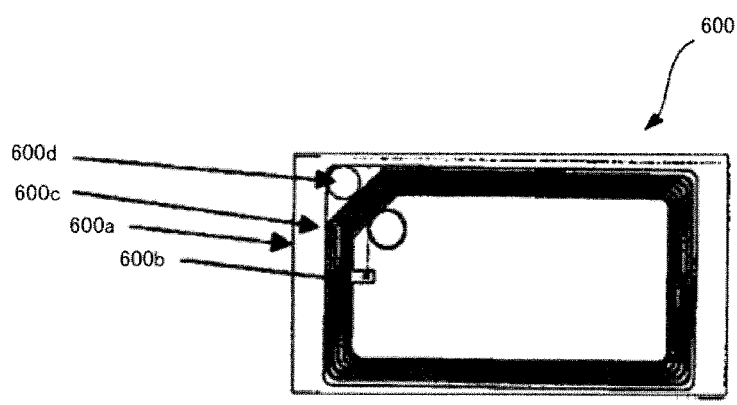
FIG. 2A is a schematic plan view illustrating one example of an inlet.
Figure 2B:
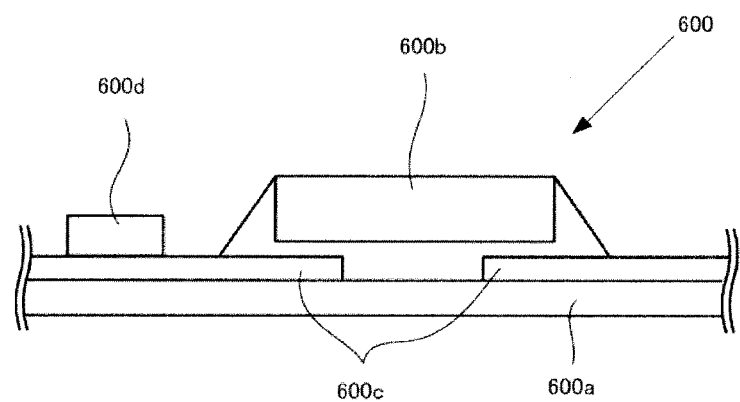
FIG. 2B is a schematic side view of the inlet illustrated in FIG. 2A.

Hereinbelow, the inlet will be described with reference to drawings. FIG. 2A is a schematic plan view illustrating one example of an inlet, and FIG. 2B is a schematic side view of the inlet illustrated in FIG. 2A.

In an inlet 600, a coiled antenna circuit 600c and a capacitative element are formed on a circuit board 600a (e.g., a plastic film) to form an LC resonance circuit, and thereby the inlet 600 can receive a radio wave having a constant frequency as well as transmit and sent back information of an electronic information recording element (IC chip) 600b to its transmission source.

Figure 3:
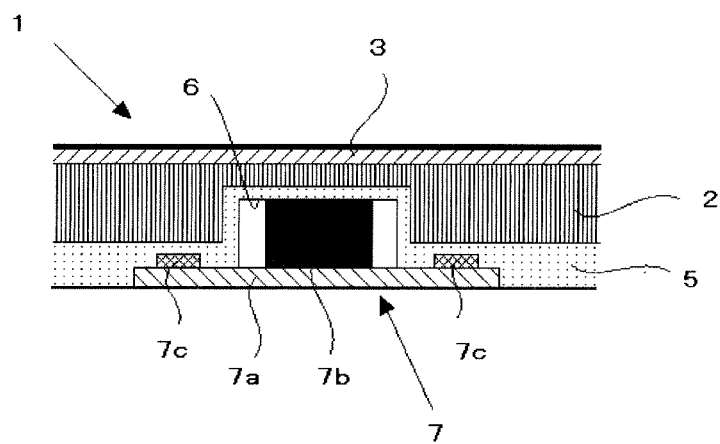
FIG. 3 is a schematic cross-sectional view illustrating one example of a thermoreversible recording medium according to the present invention.
Figure 4A:
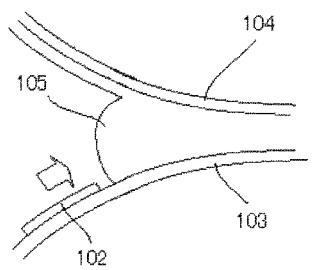
FIGS. 4A to 4C each are a view illustrating a lamination step and a control step in a method for producing a thermoreversible recording medium according to the present invention.
Figure 4B:
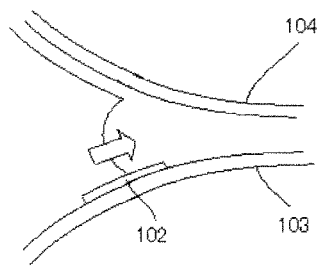
Figure 4C:
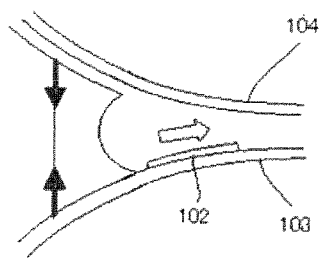
Figure 5:
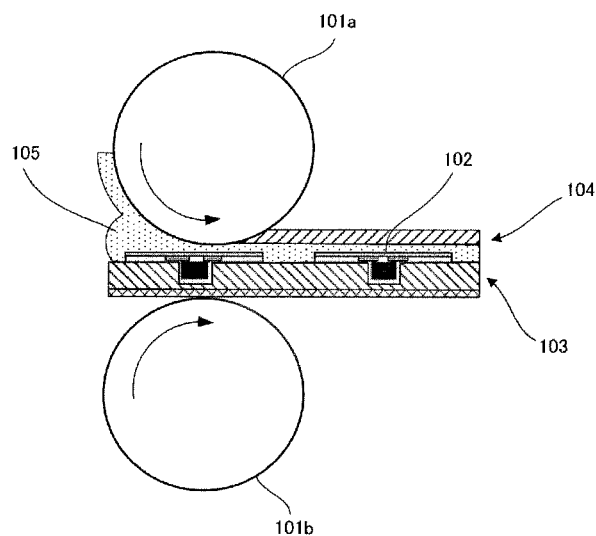
FIG. 5 is another view illustrating a lamination step and a control step in a method for producing a thermoreversible recording medium according to the present invention.

FIG. 3 is a cross-sectional view illustrating one example of a thermoreversible recording medium according to the present invention.

A thermoreversible recording medium 1 in FIG. 3 includes a reversible thermosensitive recording layer 3, a first base sheet 2 provided adjacent to the reversible thermosensitive recording layer 3, an inlet 7 having a convex-shaped IC portion 7b and an antenna circuit 7c on a circuit board 7a, and an adhesive 5 provided for bonding the first base sheet 2 and the IC portion 7b.

Here, in the first base sheet 2, a concave portion 6 is formed on a surface thereof opposite to a surface thereof on which the reversible thermosensitive recording layer 3 is provided. The inlet 7 is arranged so that the IC portion 7b is inserted into the concave portion 6 in the first base sheet 2.

With use of the thermoreversible recording medium 1, a close contact with the thermoreversible recording medium 1 is easily performed when the thermoreversible recording medium 1 is pressed against the members such as a thermal head, an erasure bar, an erasure roller, and an erasure plate in an image printing/erasure process by making the thermoreversible recording medium 1 thin and flexible. As a result, it is possible to eliminate nonuniformity of contact from the top surface of the recording medium by a thermal head or erasure bar and nonuniformity of contact from the bottom surface thereof by a platen roller, and it is also possible to accept the profile irregularity of the thermal head without causing coloring nonuniformity and erasure nonuniformity caused by contact failure to thereby stabilize the print quality.

Therefore, even when image erasure and image recording is performed at high speed, recording without causing white voids and image fading as well as image erasure without causing unerased portions are enabled in areas with concavo-convex portions such as a peripheral area of the inlet 7, a peripheral area of the IC portion 7b, a peripheral area of the antenna circuit 7c and the conductive member area, and thus excellent print quality can be obtained.

In addition, the IC portion 7b is inserted into the concave portion 6 of the first base sheet 2, a step difference or unevenness caused by the IC portion 7b can be eliminated, and thereby the print quality can be improved.

EXAMPLES

The present invention will be explained with reference to the following Examples. However, the present invention is not limited thereto.

Example 1

Production of Thermoreversible Recording Medium No. 1

—Production of First Sheet (Inlet Sheet)—

The inlet No. 1 shown in Table 1 (product of ALIEN) was used in this Example. Concave portions for inserting the IC portions were formed in 2 mm square at a center portion in one surface of a polyethylene-telephthalate (PET) resin base sheet with a thickness of 100 µm, which is served as a first base sheet. An adhesive (produced by Henkel Technologies Japan Ltd., PUR-HM adhesive PURMELT QR9504) was applied to an area including the concave portions so as to have a thickness of 20 µm. Notably, a reversible thermosensitive recording layer with a thickness of 36 µm is formed on a side of the first base sheet on which no concave portion was arranged.

Then, the concave portions on the first base sheet and the IC portions of the inlets adsorbed to the vacuum suction roller were aligned and laminated on each other between a rubber-made lamination roller and the vacuum suction roller with a nip pressure. Thus, there was produced an inlet sheet having the center-to-center distance (pitch) between adjacent inlets of 90 mm. The resultant inlet sheet was found to have the width of the product portion of 200 mm and the width of the end portions at both ends of the product portion of 5 mm.

—Production of Adhesive Sheet and Lamination—

An adhesive sheet was prepared by applying, with a dispenser, the adhesive (product of Henkel Technologies Japan Ltd., PUR-HM adhesive PURMELT QR9504) to a polyethylene-telephthalate (PET) resin sheet with a thickness of 100 µm which is served as the second base sheet so as to have the thickness of 20 µm. Thus obtained adhesive sheet was laminated with the inlet sheet by passing through between a pair of metal rollers (roller diameter: 200 mm, made of stainless steel (SUS), Vickers hardness HV: 180, gap between the metal rollers: 500 µm) with the inlet being opposite to the adhesive at a sheet feeding speed (gap roller rotational speed) of 6 m/min. Thus, a thermoreversible recording medium No. 1 was produced.

It is difficult to apply the adhesive uniformly onto a surface of the inlet sheet, i.e., the first sheet because inlets are arranged to be spaced apart from each other by predetermined intervals on the first base sheet and concavo-convex portions are present on the surface of the inlet sheet. Therefore, in the present invention, the adhesive was applied onto a smooth second base sheet.

Notably, for the thermoreversible recording medium No. 1, an amount of the adhesive to be applied was not controlled upon lamination so as to keep an adhesive liquid pool formed between the pair of the gap rollers at a constant amount (without bead control).

<Production of Thermoreversible Recording Media No. 2 and No. 3>

Thermoreversible recording media No. 2 and No. 3 were obtained in the same manner as in No. 1, provided that the inlet No. 1 (product of ALIEN) was changed to inlets No. 2 and No. 3 as depicted in Table 1. Notably, for the thermoreversible recording media No. 2 and No. 3, an amount of the adhesive to be applied was not controlled upon lamination so as to keep an adhesive liquid pool formed between the pair of the gap rollers at a constant amount (without bead control).

<Production of Thermoreversible Recording Media No. 4 to No. 17>

Thermoreversible Recording Media No. 4 to No. 17 were obtained in the same manner as in No. 1, provided that the inlet No. 1 (product of ALIEN) was changed to inlets No. 4 to No. 17 as depicted in Table 1 and the bead control was performed as described below.

<Bead Control>

The inlet sheet was laminated with the adhesive sheet by passing through the pair of gap rollers while keeping an adhesive liquid pool formed between the pair of the gap rollers at a constant amount and gradually removing bubbles from the inlet at a wall surface of the adhesive liquid pool (with bead control).

Hereinbelow, a specific method for performing the bead control will be explained with reference to FIG. 6. The bead control is performed by detecting a left edge portion (left end portion), a right edge portion (right end portion) and height of the adhesive liquid pool using a CCD color camera as a sensor and feedback-controlling.

Figure 8:
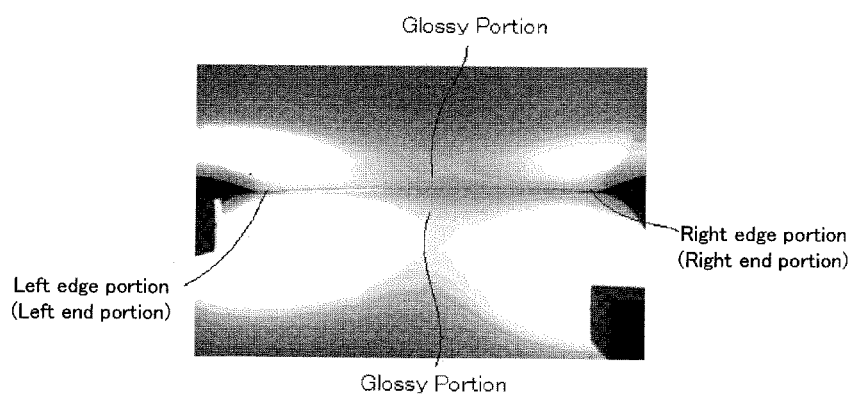
FIG. 8 is a photograph of a region between a pair of gap rollers with an adhesive liquid pool being stably controlled, which is taken by a CCD color camera from an upstream side.

(1) Detecting Method of Left Edge Portion (Left End Portion) and Right Edge Portion (Right End Portion) of Adhesive Liquid Pool FIG. 8 is a photograph of a pair of the gap rollers, at which the bead control is stably performed, taken by a CCD color camera from the upstream side. As illustrated in FIG. 8, the left and right edge portions of the adhesive liquid pool are recognized in the CCD camera image in which there are gloss portions in the center, and the black portions at the left and right edges, and therefore the presence of the adhesive liquid pool can be visually recognized.

Figure 9:
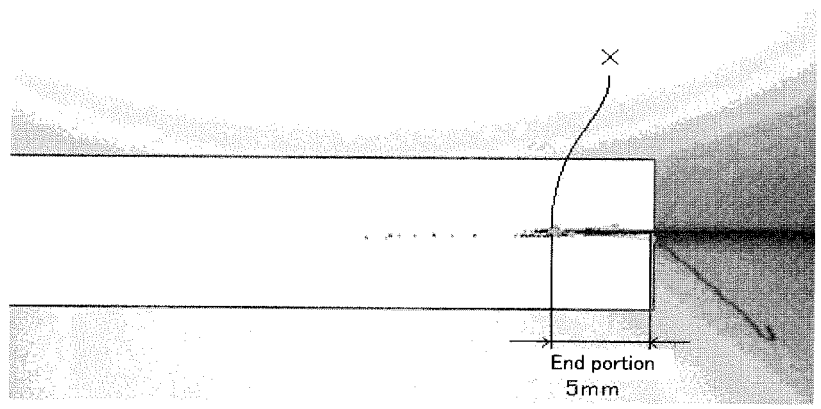
FIG. 9 is a photograph illustrating a method for defining a left edge portion and a right edge portion of an adhesive liquid pool.

Determining the density of the gloss to pure black of the adhesive liquid pool with 0% to 100%, the gradation (gray area) present in between was provided with a threshold changing a standard density depending on a type of the adhesive. For example, as illustrated in FIG. 9, the left edge portion and the right edge portion of the adhesive liquid pool were determined by the CCD camera image processing software so that the 50% gradation area became the left and right edge portions (left and right end portions). In FIG. 9, the area that is within 5 mm from the right edge, i.e., from the right edge to X, was determined as the right end portion.

(2) Detecting Method of Height of Adhesive Liquid Pool

The height of the adhesive liquid pool could be clearly detected as the eight of the gloss portion in FIG. 8. Therefore, the length of the up-down line (height) of the gloss portion was determined by the CCD camera image processing software, and the obtained value was determined as the height of the adhesive liquid pool. In FIG. 8, the height of the center of the adhesive liquid pool was 3,200 μm.

<Feedback Control Method>

(1) First, parallelism of a gap between a pair of gap rollers, which had been adjusted to a total thickness of a thermoreversible recording medium to be produced, was adjusted using a shim and a space gauge.

(2) Next, a gear pump for ejecting the adhesive was started rotating at a low rotational speed at the beginning. The rotational speed of the gear pump at the time of start is 18% relative to the maximum rotational speed.

(3) Since an amount of the adhesive, which was equivalent to the amount thereof when the adhesive liquid pool is stably controlled, was ejected initially, the adhesive liquid pool spread exceeding the end portions of the inlet sheet. Therefore, the gap between a pair of the gap rollers was photographed from the upstream side by a CCD camera, and the rotational speed of the gear pump was increased while confirming the center, left edge, and right edge of the adhesive liquid pool, to gradually widen the adhesive liquid pool from the center.

(4) Next, the rotational speed of the gear pump was adjusted to eject an amount of the adhesive, which was more than the amount thereof required for forming a thermoreversible recording medium, to form a constant size of the adhesive liquid pool in the gap between the pair of the gap rollers, and the adhesive was ejected in this state. The rotational speed at this time was 28% relative to the maximum rotational speed.

(5) The adhesive liquid pool at the pair of the gap rollers was gradually spread adjacent to the edges of the first base sheet. For example, in the case where the first base sheet had the total width of 210 mm, the center portion having a width of 110 mm (a portion extending to the left and right by 55 mm from the center) was the portion at which the rotational speed of the gear pump was increased, and the each remaining side portion of 50 mm was the portion at which the ejection amount of the adhesive was controlled to increase or decrease by the bead control. In the manner as described, the state that the bead control was stably performed was achieved as illustrated in FIG. 8.

(6) In the state where the bead control was stably controlled, the spreading width of the adhesive liquid pool from the left and right edges did not exceed the end portions (5 mm inside from each edge) as illustrated in FIG. 7.

Next, the conditions and method for the feedback control performed so that the adhesive liquid pool does not flow over the end portions of the inlet sheet will be explained.

[Feedback Control Conditions]

Control reaction cycle: 20 seconds

Control amount per control: The positions of the left and right edges portions of the adhesive liquid pool were adjusted by controlling the rotational speed of the gear pump by 5.0% relative to the maximum rotational speed in the center portion (110 mm in width) of the adhesive liquid pool, and by controlling the rotational speed of the gear pump by 1.0% relative to the maximum rotational speed in the left and right edge portions (each of the portions being 50 mm in width) outside the 110 mm wide center portion of the adhesive liquid pool.

Maximum limit of left and right edge portions: 3 mm from the edge of the first base sheet Set rotational speed of return gear pump when exceeding the maximum limit of the left and right edge portions: 25% relative to the maximum rotational speed As illustrated in FIG. 6, the left edge portion (left end portion, right edge portion (right end portion), and height of the adhesive liquid pool (S5) were detected by the sensor (S1). In the case where the adhesive liquid pool (S5) exceeded the maximum limit of the left and right edges (exceeded the end portions), it was judged by the amplifier (S2) that the reduction in the amount of the adhesive was necessary, and the rotational speed of the gear pump was decreased via the inverter (S3) (e.g., reducing the rotational speed from 28% to 25%) to reduce the ejected amount of the adhesive by the adhesion applying unit. In this case, it could be visually confirmed that the left and right edge portions of the adhesive liquid pool were dark in the CCD camera image. Note that, in the case where it cannot be visually observed, spreading of the adhesive liquid pool is caused.

On the other hand, in the case where the adhesive liquid pool (S5) did not reach the end portions after detecting the left edge portion (left end portion), right edge portion (right end portion), and height of the adhesive liquid pool (S5) by the sensor (S1), it was judged by the amplifier (S2) that an increase in the adhesive amount was necessary, and the rotational speed of the gear pump was increased via the inverter (S3) (e.g., increasing the rotational speed from 28% to 33%), to increase the ejected amount of the adhesive by the adhesive application unit.

In the case where the bead control was desirably performed based on FIG. 6, the spreading width of the adhesive liquid pool was controlled within the range of the end portions (5 mm from the edge) as illustrated in FIG. 7.

Then, the resultant thermoreversible recording media No. 1 to No. 17 were evaluated for various properties as follows. The results are shown in Table 1.

<Measurement Method of Bubble Entrapment on the Periphery of Inlet>

The obtained thermoreversible recording media were visually observed by transmitting light emitted from a fluorescent lamp through the media, and the presence and size of bubbles in the surrounding area of the inlet were measured with a scale (vernier caliper) and evaluated according to the following criteria.

[Evaluation Criteria]

A: No bubble was observed in the surrounding area of the inlet.

B: Bubbles having a size of 0 mm or more but less than 0.6 mm were present in the surrounding area of the inlet.

C: Bubbles having a size of 0.6 mm or more but less than 1.0 mm were present in the surrounding area of the inlet.

D: Bubbles having a size of 1.0 mm or more but less than 1.4 mm were present in the surrounding area of the inlet.

E: Bubbles having a size of 1.4 mm or more were present in the surrounding area of the inlet.

<State of Air Bubbles in Surrounding Area of Inlet in 3 Days after Lamination>

The obtained thermoreversible recording media were visually observed by transmitting light emitted from a fluorescent lamp through the media, and the presence and size of air bubbles in the surrounding area of the inlet were measured with a scale (vernier caliper).

Then, 3 days after the lamination, the size of the air bubbles and the edge size thereof in the surrounding area of the antenna were measured, compared with that of immediately after the lamination, and evaluated according to the following criteria.

[Evaluation Criteria]

A: As compared with the state of the bubbles immediately after the lamination, no generation of bubbles was observed.

B: As compared with the state of the bubbles immediately after the lamination, bubbles were further generated.

<Measurement Method of Unevenness (A-B) on Surface (Flatness)>

After the lamination, the thickness A of areas provided with an inlet and the thickness B of areas provided with no inlet were measured with a micrometer (product of Mitsutoyo K.K., 389-251), and a difference (A-B) in thickness therebetween was determined as a surface unevenness value. The thickness A and thickness B were average thicknesses of any 10 or more measurement positions. As the surface unevenness value is smaller, the surface is flatter. An acceptance criterion of the surface unevenness value in the present invention is 15 μm or less.

TABLE 1

| No. | Bead Control | Frequency Band | Inlet Type | Manufacture |
|---|---|---|---|---|
| 1 | No | UHF Type C | — | ALIEN |
| 2 |  |  | AD-631 | AVERY |
| 3 |  | HF | Aluminium | UPM |
| 4 | Yes | HF | K101-A | KOTOBUKI FORMS |
| 5 |  |  | — | TOPPAN FORMS |
| 6 |  |  | — | NEC TOKIN |
| 7 |  |  | Aluminium | UPM |
| 8 |  | UHF Type C | IIM2-JR2A | TOPPAN FORMS |
| 9 |  |  | IIM2-U112A | TOPPAN FORMS |
| 10 |  |  | IIM2-T132A | TOPPAN FORMS |
| 11 |  |  | Latica card | TOPPAN FORMS |
| 12 |  |  | AD-631 | AVERY |
| 13 |  |  | Dumbbell | DNP |
| 14 |  |  | LMU001-T-A | NECTOKIN |
| 15 |  |  | — | ALIEN |
| 16 |  |  | ORION-P95 | HITACHI |
| 17 |  | UHF Type B | TAG23AA | FUJITSU |

| No. | Thickness of base | Thickness of antenna portion | Thickness of chip portion | Step Difference of chip portion | Thickness of swage portion |
|---|---|---|---|---|---|
| 1 | 51 μm | 55 μm | 265 μm | 210 μm | — |
| 2 | 81 μm | 105 μm | 301 μm | 196 μm | — |
| 3 | 43 μm | 73 μm | 249 μm | 176 μm | 139 μm |
| 4 | 41 μm | 71 μm | 253 μm | 170 μm | 235 μm |
| 5 | 54 μm | 68 μm | 235 μm | 167 μm | 205 μm |
| 6 | 43 μm | 73 μm | 246 μm | 163 μm | 187 μm |
| 7 | 43 μm | 73 μm | 249 μm | 176 μm | 139 μm |
| 8 | 62 μm | 80 μm | 248 μm | 168 μm | — |
| 9 | 63 μm | 80 μm | 251 μm | 171 μm | — |
| 10 | 61 μm | 79 μm | 250 μm | 171 μm | — |
| 11 | 62 μm | 79 μm | 250 μm | 171 μm | — |
| 12 | 81 μm | 105 μm | 301 μm | 196 μm | — |
| 13 | 38 μm | 58 μm | 225 μm | 167 μm | — |
| 14 | 55 μm | 70 μm | 230 μm | 160 μm | — |
| 15 | 51 μm | 55 μm | 265 μm | 210 μm | — |
| 16 | 29 μm | 49 μm | 216 μm | 167 μm | — |
| 17 | 39 μm | 54 μm | 229 μm | 175 μm | — |

TABLE 1-continued

| No. | Bubble inclusion in surrounding area of inlet | State of bubbles 3 days after lamination in surrounding area of inlet | Thickness of area provided with inlet (A) | Thickness of area provided with no inlet (B) | Difference in height (A − B) |
|---|---|---|---|---|---|
| 1 | D | Diameter: 3 mm (number of bubbles: 7): B | 496 μm | 373 μm | 123 μm |
| 2 | E | Diameter: 3, 4 mm (number of bubbles: 8): B | 650 μm | 413 μm | 237 μm |
| 3 | C | Diameter: 2, 3 mm (number of bubbles: 3): B | 498 μm | 396 μm | 102 μm |
| 4 | A | No progress in bubbles: A | 388 μm | 378 μm | 10 μm |
| 5 | A | No progress in bubbles: A | 394 μm | 381 μm | 13 μm |
| 6 | A | No progress in bubbles: A | 398 μm | 389 μm | 9 μm |
| 7 | A | No progress in bubbles: A | 398 μm | 386 μm | 12 μm |
| 8 | A | No progress in air bubbles: A | 405 μm | 401 μm | 4 μm |
| 9 | A | No progress in air bubbles: A | 407 μm | 398 μm | 9 μm |
| 10 | A | No progress in air bubbles: A | 410 μm | 398 μm | 12 μm |
| 11 | A | No progress in air bubbles: A | 404 μm | 395 μm | 9 μm |
| 12 | A | No progress in air bubbles: A | 430 μm | 413 μm | 17 μm |
| 13 | A | No progress in air bubbles: A | 383 μm | 370 μm | 13 μm |
| 14 | A | No progress in air bubbles: A | 393 μm | 390 μm | 3 μm |
| 15 | A | No progress in air bubbles: A | 376 μm | 373 μm | 3 μm |
| 16 | A | No progress in air bubbles: A | 391 μm | 383 μm | 8 μm |
| 17 | A | No progress in air bubbles: A | 379 μm | 366 μm | 13 μm |

It was found from the results presented in Table 1 that Nos. 4 to 17 did not include air bubbles in the surrounding area of the inlet, and the surface unevenness thereof was kept small as a result of the bead control. In addition, even after being left for 3 days, inclusion of air bubbles was not observed.

On the other hand, if the bead control was not performed, as in the case of Nos. 1 to 3, air bubbles were included in the surrounding area of the inlet, and the surface unevenness thereof became large. Moreover, after leaving for 3 days, inclusion of air bubbles in the surrounding area of the inlet was observed.

Example 2

Confirmation of Influence of Type and Viscosity of Adhesive

An inlet sheet and an adhesive sheet were bonded together to produce a thermoreversible recording medium in the same manner as in Example 1, provided that a type and viscosity of the adhesive, lamination temperature, and to perform or not to perform the bead control were changed as depicted in Table 2. Note that, AD-631 (manufactured by AVERY) of No. 2 of Table 1 was used as the inlet, and the bead control was performed in the same manner as in Example 1.

The various properties of the obtained thermoreversible recording medium were evaluated in the following manner. The results are presented in Table 2.
<Measuring Method of Viscosity of Adhesive Liquid>

The viscosity of the adhesive liquid was measured by means of a viscometer (HADV-IIPro, manufactured by Brookfield Engineering Laboratories) at the lamination temperature.

<Evaluation on Control of Adhesive Liquid Spread with or without Bead Control>

Whether or not the position of the spread adhesive liquid was controlled depending on performing or not performing the bead control was determined by the aforementioned detecting method of the left edge and right edge portions of the adhesive liquid pool, and the results were evaluated based on the following criteria.
[Evaluation Criteria]

A: There was no overflow of the adhesive liquid pool, and the spread adhesive liquid pool could be controlled within the end portions (5 mm).

B: There was a slight overflow of the adhesive liquid pool, but the spread adhesive liquid pool was controlled through part thereof exceeded the end portions.

C: There was the overflow of the adhesive liquid pool, and the spread adhesive liquid pool was not controlled.
<Evaluation on Displacement of Inlet>

An adhesive (20 μm in thickness) was applied as a base of an inlet on a back surface of a base sheet of each of the produced thermoreversible recording media, and the position of the inlet was marked with the inlet bonded on the adhesive. After passing through between gap rollers together with a base via the adhesive liquid pool to bond the base sheet with the base, how much the inlet was displaced from the marked position after the bonding was measured using a scale (a caliper). The degree of the displacement was evaluated based on the following criteria.
[Evaluation Criteria]

A: No displacement (0 mm)

B: The inlet was displaced by 0 mm or more but less than 5 mm

C: The inlet was displaced by 5 mm or more

<Evaluation on Flatness>

In the case where irregularities could not be visually observed on a surface of each of the produced thermoreversible recording media, a total thickness of the inlet bonded portion was measured by clamping the front and back surfaces of the thermoreversible recording medium by means of a micrometer (389-251, manufactured by Mitutoyo Corporation) the measuring surfaces of which were flat surfaces having a diameter of 5 mm, and the results were evaluated based on the following criteria.

[Evaluation Criteria]

A: The variation in the total thickness within the inlet bonded portion was 15 μm or less.

B: The variation in the total thickness within the inlet bonded portion was more than 15 μm.

C: There were irregularities which could be clearly observed visually.

TABLE 2

| Adhesive Type | Viscosity of Adhesive (cps) | Lamination Temperature (° C.) |
|---|---|---|
| A1 | 8,360 | 20 |
| A2 | 27,000 | 20 |
| B1 | 300,000 | 60 |
| B2 | 52,000 | 70 |
| B3 | 20,000 | 80 |
| B4 | 9,500 | 100 |
| B5 | 6,500 | 110 |
| B6 | 4,000 | 120 |
| B7 | 3,000 | 130 |
| C1 | 300,000 | 60 |
| C2 | 80,000 | 70 |
| C3 | 41,500 | 80 |
| C4 | 19,000 | 100 |
| C5 | 14,000 | 110 |
| C6 | 9,000 | 120 |
| C7 | 7,000 | 130 |
| D1 | 11,000 | 110 |
| D2 | 7,000 | 120 |
| E1 | 4,400 | 170 |
| E2 | 7,500 | 160 |
| E3 | 9,700 | 150 |
| E4 | B: pellet deformed gel | 140 |
| E5 | B: pellet formed gel (like toothpaste) | 130 |
| E6 | B: pellet formed gel (like soft cheese) | 120 |
| F1 | 4,200 | 160 |
| F2 | 8,700 | 140 |
| F3 | 30,000 | 120 |
| F4 | B: deformed mass | 110 |
| G1 | 1,800 | 180 |
| G2 | 2,800 | 160 |
| G3 | 5,000 | 140 |
| G4 | B: pellet formed gel (like toothpaste) | 130 |
| G5 | B: pellet formed gel (like toothpaste) | 120 |
| G6 | C | 110 |

| Adhesive Type | Spread Control of Adhesive Liquid | | Displacement of Inlet | Flatness |
|---|---|---|---|---|
| | With Bead Control | Without Bead Control | | |
| A1 | C | C | C | A |
| A2 | A | C | A | A |
| B1 | C | C | C | C |
| B2 | A | A | A | A |
| B3 | A | C | A | A |
| B4 | A | C | A | A |
| B5 | C | C | C | A |
| B6 | C | C | C | A |
| B7 | C | C | C | C |
| C1 | C | C | C | C |
| C2 | A | A | A | A |
| C3 | A | B | A | A |
| C4 | A | C | A | A |
| C5 | A | C | A | A |
| C6 | C | C | C | A |
| C7 | C | C | C | A |
| D1 | A | C | A | A |
| D2 | C | C | C | A |
| E1 | C | C | C | A |
| E2 | C | C | C | A |
| E3 | A | C | A | A |
| E4 | C | C | C | C |
| E5 | C | C | C | C |
| E6 | C | C | C | C |
| F1 | C | C | C | A |
| F2 | C | C | C | A |
| F3 | A | C | A | A |
| F4 | C | C | C | C |
| G1 | C | C | C | C |
| G2 | C | C | C | C |
| G3 | C | C | C | A |
| G4 | C | C | C | C |
| G5 | C | C | C | C |
| G6 | C | C | C | C |

A1: product of Sunstar Engineering Inc., urethane-based underfill material, product name: PENGUIN CEMENT, type: 992
A2: product of Sunstar Engineering Inc., urethane-based underfill material, product name: PENGUIN CEMENT, type: 991D
B1 to B7: product of Henkel Technologies Japan Ltd., reactive hotmelt adhesive (urethane-based), product name: PURMELT QR9504
C1 to C7: product of Henkel Technologies Japan Ltd., reactive hotmelt adhesive (urethane-based), product name: PERFECT LOCK 7M7024)
D1 and D2: product of Henkel Technologies Japan Ltd., reactive hotmelt adhesive (urethane-based), product name: PERFECT LOCK MR70)
E1 to E6: product of Henkel Technologies Japan Ltd., thermoplastic hotmelt adhesive (olefin-based), product name: INSTANT LOCK MP802)
F1 to F4: product of Henkel Technologies Japan Ltd., thermoplastic hotmelt adhesive (olefin-based), product name: INSTANT LOCK MP7926)
G1 to G6: product of Henkel Technologies Japan Ltd., thermoplastic hotmelt adhesive (olefin-based), product name: INSTANT LOCK MP803)

Example 3

Inlet Interval Confirmation Test

Inlet sheets were produced in the same manner as in Example 1, provided that center-to-center distances (pitches) between adjacent inlets were changed to 300 mm, 100 mm, 10 mm, 5 mm, 3 mm, 2 mm and 1 mm.

Then, thermoreversible recording media were produced by laminating the adhesive sheets produced in Example 1 with the inlet sheets in the same manner as in Example 1, except that the following conditions were used. Notably, upon lamination, the bead control was performed in the same manner as in Example 1.

[Experimental Condition]

Adhesive: product of Henkel Technologies Japan Ltd., product name: PUR-HM adhesive PURMELT QR9504

Adhesive viscosity: 20,000 cps (80° C.)

Lamination temperature: 80° C.

Inlet Type: AD-631 (product of AVERY, No. 2 in Table 1)

Then, for the resultant thermoreversible recording media, generations of bubbles in the surrounding areas of the inlets were evaluated in the same manner as in Example 1. As a result, it was found that no further bubbles was formed in the surrounding areas of the inlets in any case where the center-to-center distance (pitch) between adjacent inlets was 300 mm, 100 mm, 10 mm, 5 mm, 3 mm, 2 mm or 1 mm, indicating excellent laminations.

Example 4

Confirmation Test of Displacement of IC Position after Passing Through Between Gap Rollers Thermoreversible recording media were produced by laminating the adhesive sheets with the inlet sheets in the same manner as in Example 1, provided that conditions shown in Table 4 and the following experimental conditions were used. Notably, upon lamination, the bead control was performed in the same manner as in Example 1.

[Experimental Condition]

Sheet base: polyethylene terephthalate (PET) with a thickness of 250 μm

Inlet: product of Hitachi, Ltd., HIBIKI inlet, base thickness 30 μm+antenna thickness 20 μm, total thickness 50 μm Adhesive: product of Henkel Technologies Japan Ltd., PUR HM PURMELT QR9504

Adhesive viscosity: 20,000 cps (80° C.)

Thickness of Adhesive layer: 20 μm

Adhesive sheet: polyethylene terephthalate (PET) with a thickness of 55 μm

Gap roller: made of stainless steel (SUS), diameter: 200 mm, Vickers hardness HV: 180, gap: 500 μm Sheet feeding speed (Gap roller rotation speed): 6 m/min Lamination temperature: 80° C.

TABLE 4

| No. | Inlet sheet side charging temperature | Adhesive | Viscosity (cps) |
|---|---|---|---|
| 1 | 24° C. | C | No thermal activity |
| 2 | 60° C. | C | No thermal activity |
| 3 | 60° C. | B | 300,000 |
| 4 | 80° C. | C | 24,000 |
| 5 | 80° C. | B | 40,000 |
| 6 | 80° C. | C | 24,000 |
| 7 | 80° C. | C | 24,000 |
| 8 | 80° C. | C | 24,000 |

| No. | Adhesive gap above inlet | Displacement of IC or inlet (mm) | Surface unevenness |
|---|---|---|---|
| 1 | 70 μm (+0 μm) | 0 | Evenness of inlet portion: 15 μm<br>Surface unevenness: A |
| 2 | 70 μm (+0 μm) | 0 | Evenness of inlet portion: 15 μm<br>Surface unevenness: A |
| 3 | 70 μm (+0 μm) | 0 | Evenness of inlet portion: 15 μm<br>Surface unevenness: A |
| 4 | 70 μm (+0 μm) | 1.5 to 2.0 | Displacement of IC: C |
| 5 | 70 μm (+0 μm) | 4.0 to 10.0 | Displacement of IC: C |
| 6 | 90 μm (+20 μm) | 1.0 | Displacement of IC: C |
| 7 | 115 μm (+45 μm) | 0 to 0.5 | Displacement of IC: C |
| 8 | 145 μm (+75 μm) | 0 | Evenness of inlet portion: 15 μm<br>Surface unevenness: A |

Adhesive gap above inlet denotes a thickness of the adhesive layer relative to inlet 50 μm + adhesive 20 μm = 70 μm. The number in parentheses denotes excessive gap height above the inlet.

TABLE 5

| | Viscosity (cps) | |
|---|---|---|
| Temperature (° C.) | Adhesive B | Adhesive C |
| 60 | 300,000 | 300,000 |
| 70 | 80,000 | 52,000 |
| 80 | 41,500 | 20,000 |
| 100 | 19,000 | 9,500 |
| 110 | 14,000 | — |
| 120 | 9,000 | — |
| 130 | 7,000 | 3,000 |

Adhesive B: product of Henkel Technologies Japan Ltd., reactive hotmelt adhesive (urethane-based), product name: PURMELT QR9504
Adhesive C: product of Henkel Technologies Japan Ltd., reactive hotmelt adhesive (urethane-based), product name: PERFECT LOCK MR900RI The adhesive having the viscosity of 24,000 cps or less at the lamination temperature of 80° C. may cause a displacement of the inlet unless there is a sufficient gap (+75 μm or more) on the inlet, as the inlet placed in the middle of the inlet sheet and the adhesive sheet is pushed off by the gap of the gap rollers. Moreover, the inlet may be displaced by the flow of the adhesive for pushing out the excess adhesive to form the adhesive liquid pool. It was found from the results of Tables 4 and 5 that the displacement of the inlet could be prevented with the very small space of the gap rollers, and with the adhesive having the high viscosity, by setting the lamination temperature of the inlet sheet and the adhesive sheet to 60° C. or lower, and passing the sheets through the gap between the pair of the gap rollers without decreasing the viscosity of the adhesive.

The embodiments of the present invention are as follows.

<1> A method for producing a thermoreversible recording medium, containing:

arranging inlets on a first base sheet to be spaced apart from each other by predetermined intervals to thereby produce a first sheet, where the first sheet has a product portion including the inlets and end portions at both ends of the product portion;

applying an adhesive onto a second base sheet using an adhesive application unit, to produce a second sheet;

passing the first sheet and the second sheet through a gap between a pair of gap rollers in the manner that the inlets and the adhesive face to each other to laminate the first sheet with the second sheet, while forming an adhesive liquid pool in an upstream of the gap; and feedback controlling an amount of the adhesive to be applied in the applying so that the adhesive liquid pool does not flow into the end portions on the first sheet.

<2> The method according to <1>, wherein the feedback controlling contains detecting the adhesive liquid pool by a sensor, and increasing the amount of the adhesive to be applied by the adhesive application unit in the applying in the case where the adhesive liquid pool does not reach the end portions of the first sheet and spreads within the product portion, or decreasing the amount of the adhesive to be applied by the adhesive application unit in the applying in the case where the adhesive liquid pool flow over the product portion into the end portions on the first sheet.

<3> The method according to <2>, wherein the sensor is a single point laser displacement sensor, a straight line-shaped two-dimensional displacement sensor, an imaging camera sensor, or an infrared temperature detection sensor.

<4> The method according to any one of <1> to <3>, wherein a viscosity of the adhesive is 10,000 cps to 100,000 cps at temperature for the laminating.

<5> The method according to any one of <1> to <4>, wherein the first sheet is laminated with the second sheet at 60° C. to 100° C.

<6> The method according to any one of <1> to <5>, wherein a center-to-center distance between the adjacent inlets on the first sheet is 1 mm to 500 mm.

<7> The method according to any one of <1> to <6>, wherein a width to which the adhesive is applied on the second sheet is 70% to 100% relative to a width of the product portion of the first sheet.

<8> An apparatus for producing a thermoreversible recording medium, containing:

a first sheet production unit configured to arrange inlets on a first base sheet to be spaced apart from each other by predetermined intervals to thereby produce a first sheet having a product portion including the inlets and end portions at both ends of the product portion;

a second sheet production unit configured to apply an adhesive onto a second base sheet using an adhesive application unit, to produce a 20 second sheet;

a lamination unit configured to pass the first sheet and the second sheet through a gap between a pair of gap rollers in the manner that the inlets and the adhesive face to each other to laminate the first sheet with the second sheet, while forming an adhesive liquid pool in an upstream of the gap; and a control unit configured to feedback control an amount of the adhesive to be applied in the applying so that the adhesive liquid pool does not flow into the end portions on the first sheet.

<9> A thermoreversible recording medium produced by the method according to any one of <1> to <7>.

The method and apparatus for producing a thermoreversible recording medium of the present invention can suitably used for production of a thermoreversible recording medium having an inlet, because they enable to bond the inlet and a convex-shaped electronic information recording element together without including air bubbles, to prevent recording and printing failures of a thermoreversible recording medium due to a contact failure with a flat printing head (metal surface), which is caused due to a minute surface distortion of several tens micrometers, to continuously produce a thermoreversible recording medium at high efficiency, and to produce a thermoreversible recording medium of various size.

Moreover, the method of the present invention can be widely applied for bonding of sheets, other than the production of a thermoreversible recording medium, because a total adjustment start up time can be shortened in each step, which usually requires a long time due to complexity of bonding of sheets without including air bubbles in a surrounding area of an inlet, and due to complexity of operations to give uniformity of a total thickness within the plane of a sheet product obtained by bonding, without depending on the adjustment of an ejection amount of an adhesive on the sheet to give a uniform film thickness.

REFERENCE SIGNS LIST

1 Thermoreversible recording medium
2 First base sheet
3 Reversible thermosensitive recording layer
5 Adhesive
6 Concave portion
7 Inlet
7a Circuit board
7b IC portion
7c Antenna portion
101a Gap roller
101b Gap roller
102 Inlet
103 Inlet sheet
104 Adhesive sheet
105 Adhesive liquid pool
600 Inlet
610 Air bubble

The invention claimed is:

1. A method for producing a thermoreversible recording medium, comprising:
   (a) arranging inlets to be spaced apart from each other by predetermined intervals, on a first base sheet that additionally includes a thermosensitive recording layer, to thereby produce a first sheet, where the first sheet has a product portion including the inlets and end portions at both ends of the product portion;
   (b) applying an adhesive onto a second base sheet using an adhesive application unit, to produce a second sheet;
   (c) passing the first sheet and the second sheet through a gap between a pair of gap rollers in the manner that the inlets and the adhesive face each other to laminate the first sheet with the second sheet, while forming an adhesive liquid pool in an upstream of the gap; and
   (d) feedback controlling an amount of the adhesive to be applied in (b) so that the adhesive liquid pool does not flow into the end portions on the first sheet.

2. The method according to claim 1, wherein the feedback controlling comprises detecting the adhesive liquid pool by a sensor, and increasing the amount of the adhesive to be applied by the adhesive application unit in the case where the adhesive liquid pool does not reach the end portions of the first sheet and spreads within the product portion, or decreasing the amount of the adhesive to be applied by the adhesive application unit in the case where the adhesive liquid pool flows over the product portion into the end portions on the first sheet.

3. The method according to claim 2, wherein the sensor is a single point laser displacement sensor, a straight line-shaped two-dimensional displacement sensor, an imaging camera sensor, or an infrared temperature detection sensor.

4. The method according to claim 1, wherein a viscosity of the adhesive is 10,000 cps to 100,000 cps at temperature for the laminating.

5. The method according to claim 1, wherein the first sheet is laminated with the second sheet at 60° C. to 100° C.

6. The method according to claim 1, wherein a center-to-center distance between the adjacent inlets on the first sheet is 1 mm to 500 mm.

7. The method according to claim 1, wherein a width to which the adhesive is applied on the second sheet is 70% to 100% relative to a width of the product portion of the first sheet.

8. The method according to claim 1, wherein the inlets are disposed on an inlet-side of the first base sheet and the thermosensitive recording layer is disposed on an opposite side of the first base sheet.

9. An apparatus for producing a thermoreversible recording medium, comprising:
   a first sheet production unit configured to arrange inlets to be spaced apart from each other by predetermined intervals, on a first base sheet that additionally includes a thermosensitive recording layer, to thereby produce a first sheet having a product portion including the inlets and end portions at both ends of the product portion;
   a second sheet production unit configured to apply an adhesive onto a second base sheet using an adhesive application unit, to produce a second sheet;
   a lamination unit configured to pass the first sheet and the second sheet through a gap between a pair of gap rollers in the manner that the inlets and the adhesive face to each other to laminate the first sheet with the second sheet, while forming an adhesive liquid pool in an upstream of the gap; and
   a control unit configured to feedback control an amount of the adhesive to be applied so that the adhesive liquid pool does not flow into the end portions on the first sheet.

10. A thermoreversible recording medium produced by a method for producing a thermoreversible recording medium, comprising:
   arranging inlets to be spaced apart from each other by predetermined intervals, on a first base sheet that additionally includes a thermosensitive recording layer, to thereby produce a first sheet, where the first sheet has a product portion including the inlets and end portions at both ends of the product portion;

applying an adhesive onto a second base sheet using an adhesive application unit, to produce a second sheet;

passing the first sheet and the second sheet through a gap between a pair of gap rollers in the manner that the inlets and the adhesive face to each other to laminate the first sheet with the second sheet, while forming an adhesive liquid pool in an upstream of the gap; and feedback controlling an amount of the adhesive to be applied so that the adhesive liquid pool does not flow into the end portions on the first sheet.

\* \* \* \* \*